Nov. 5, 1940.  T. H. LEATHEM, SR  2,220,339
VALVE-IN-PISTON CONTROLLING DEVICE
Filed June 27, 1938
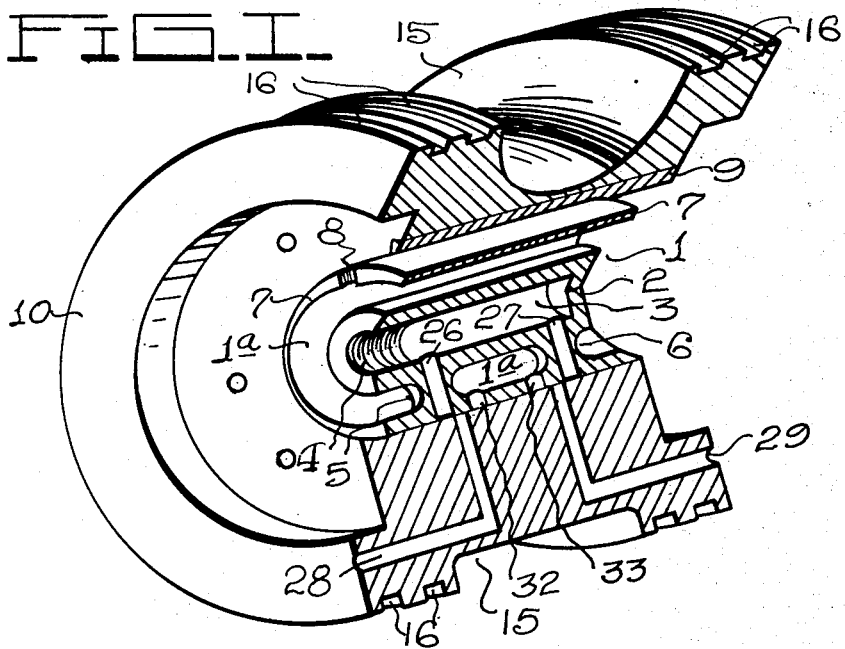
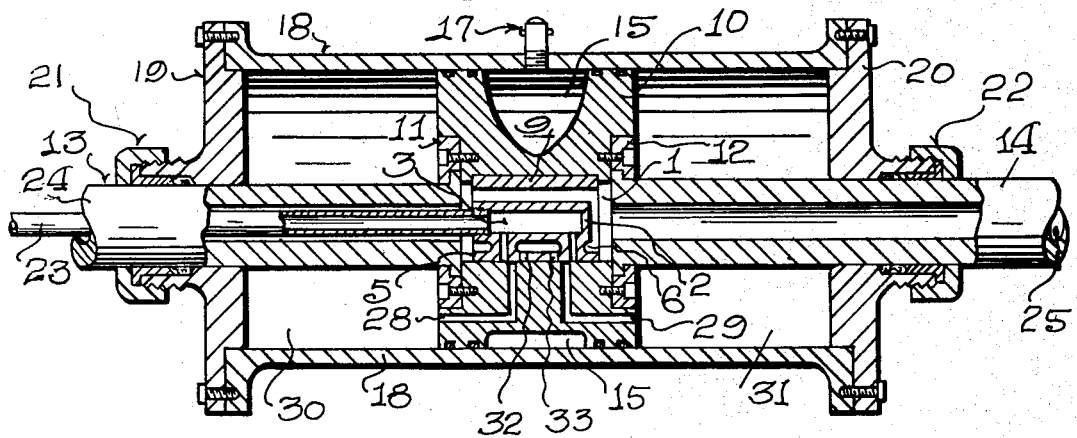
Thomas H. Leathem, Sr.
INVENTOR:
BY
ATTORNEY.

Patented Nov. 5, 1940

2,220,339

UNITED STATES PATENT OFFICE 2,220,339

VALVE-IN-PISTON CONTROLLING DEVICE

Thomas H. Leathem, Sr., Ennis, Tex.

Application June 27, 1938, Serial No. 216,112

1 Claim. (Cl. 121—41)

This invention relates to a controlling device for power operated mechanisms, and it has particular reference to a device in which a valve is positioned within a controlled piston.

The objects of the present invention are, first: to provide a servo-motor in which the valve is so arranged in the piston that it may have a predetermined degree of movement independently of the piston; second: separate means by which the valve is manipulated in the piston and through the medium of which fluid is introduced into the valve to effect displacement of the piston; third: a means of escape for the fluid pressure from chambers defined by and on either side of the piston as it moves in its cylinder. Broadly, the invention provides a simplified servo-motor in which creeping of the piston is obviated, due chiefly to the equalizing effect of the pressure thereon, irrespective of the position of the piston in the cylinder.

With the foregoing objects as paramount, the invention has particular reference to its salient features of construction and arrangement of parts which will become manifest as the description proceeds, taken in connection with the accompanying drawing, wherein:

Figure 1 is a perspective view of the valve-in-piston controlling mechanism, shown with portions broken away, and Figure 2 is a view in vertical section, and showing the dual piston rods and the fluid inlet.

The present invention contemplates the provision of a valve slidably arranged within a piston in such a manner that by manually or otherwise positioning the valve, the piston is constrained to move in accordance therewith, either in a reciprocating motion or to any position desired. Moreover, the structure to be hereinafter described precludes the possibility of creeping of the piston, connecting rods and attendant parts to an undesired position. The valve-in-piston controlling device may be adapted to a wide variety of uses such as on locomotive reversing gears, throttles, grate bar shakers, dampers, etc., and as a manually or mechanically operated control for boats, ships or aircraft, as well as for brakes on trucks and busses. The device can be operated with compressed air, steam or by hydraulic pressure.

Referring to the drawing, the reference numeral 1 denotes a slidably arranged valve constructed as best shown in Figure 1. This valve is comprised of an inner portion 2, which portion is formed with an axial chamber 3 extending substantially throughout the length of the portion 2. Threads 4 are provided as shown. The valve portion 2 is connected by webs 5 and 6 to an integrally formed and annular member 7, which member is provided with a longitudinal slot and which is arranged to slidably receive the lower part of a key 9. An annular space 1a is thus provided between the inner portion 2 and the annular member 7. The slot 8 further provides means whereby an expansive force is exerted by the annular member 7 against the bore of a piston 10.

The piston 10 is provided with indentations at either end to receive locking plates 11 and 12, which plates are bolted or otherwise secured to the piston 10 and serve to lock piston rods 13 and 14 to the piston 10 in axial alignment.

The piston 10 is formed so as to define an annular chamber 15, which chamber serves as a reservoir for a lubricant. The piston 10, is provided with a series of peripherally arranged grooves 16 into which grooves cylinder rings, composition packing or leather cups may be positioned.

Lubricant is supplied to the annular chamber 15 through the medium of a lubricant supply means 17.

A cylinder 18 flanged at either end as shown surrounds the piston 10 and its attendant assembly. Plates 19 and 20 are bolted or otherwise secured to the cylinder 18 as shown in Figure 2. The plate 19 is provided with a packing assembly 21, and the plate 20 is similarly provided with a packing 22.

A supply pipe 23, is arranged within the piston rod 13 and is threadably connected to the inner valve portion 2 as shown in Figure 2. Fluid pressure, either air, steam or hydraulic from a source, not shown, is supplied to the axial chamber 3 through the supply pipe 23. The piston rod 13 is provided with an axial chamber 24 which chamber is of greater diameter than the outside diameter of the supply pipe 23. The piston rod 14 is likewise provided with a central opening 25.

The valve 1 is provided with a port 26 extending through the web 5 and a port 27 extending through the web 6.

When the valve 1 is in central position, as shown, the ports 26 and 27 are in line and line positions with the ports 28 and 29 respectively. In this position fluid pressure impressed upon the supply pipe 23 and transferred to the axial chamber 3, thence to the ports 26 and 27 will be transferred through the ports 26 and 28, 27 and 29 into chambers 30 and 31, respectively. Thus it will be seen that when the supply pipe 23, whose position may be manually or otherwise controlled, is in neutral position, as illustrated, an equal pressure results within the annular chambers 30 and 31.

Ports 32 and 33 interconnect the outer surface of the valve 1 and the chamber 1a. In construction the valve 1 is shorter by twice the diameter of the intake ports 28 and 29, than the length of the inside of the piston 10. This provides enough clearance on each end of the valve for the movement of the valve to shift from one port to the other and exhaust at the same time through the exhaust ports 32 and 33.

As hereinabove explained the controlling device may be actuated by force exerted by any one of a number of fluids under pressure. Compressed air will be used as an example. The air is supplied through the supply pipe 23 to the axial chamber 3. When the valve 1 is in the center position illustrated both exhaust ports 32 and 33 are closed, and both intake ports 26 and 27 are in a line and line position with the piston ports 28 and 29. In this position, with the ports tangentially arranged, leakage will occur and the line pressure impressed upon the supply pipe 23 will be transferred to the annular chambers 30 and 31. An equal pressure is thus exerted on each end of the piston 10 within the cylinder 18.

When the valve 1 is manually or otherwise displaced to the left through the medium of the supply pipe 23, port 27 is opened to port 29 and air under pressure is allowed to flow into the chamber 31. Simultaneously, the port 26 is closed to the port 28, and the port 32 is opened to the port 28. The compressed air within the chamber 30 is free to exhaust through the port 28 and the port 32, through the chamber 1a, and thence through the openings 24 and 25 within the piston rods 13 and 14, respectively, to atmosphere.

If the valve 1 is forced to travel with the piston 10, the piston will travel to a position adjacent the plate 19. However, if the valve 1 is stopped in any position, the piston 10 will travel the width of the ports 28 and 29 and stop since the ports 32 and 33 will be closed to the ports 28 and 29, thereby preventing escape of air through the ports 28 and 29. Since the valve structure is identical on either side of a center line therethrough, it is obvious that line motions of the valve 1 and the piston 10 will take place in the opposite direction when the pipe 23 is displaced to the right.

Manifestly, the construction as shown and described is capable of some modification and such modification as may be construed within the scope and meaning of the appended claim is also considered to be within the spirit and intent of the invention.

What is claimed is:

A controlling device for power operated mechanisms comprising a cylinder having closed ends, a piston in said cylinder having an open core and provided with packing means engaging the walls of said cylinder and an annular lubricant receiving recess, said piston further having fluid passages effecting communication between said core and the chambers on either side of said piston, coaxially aligned, hollow plungers affixed to the ends of said piston and extending slidably through opposite ends of said cylinder, a valve arranged for limited sliding movement in said piston core having a closed axial chamber provided with ports capable of alternately registering with said fluid passages as said valve is reciprocated, a fluid pressure line through one of said hollow plungers and connected with said axial chamber, resilient expansible means on said valve engaging the wall of said piston core, defining an annular space surrounding said valve and communicating with said cylinder chambers through spaced fluid ports and the fluid passages of said piston, the spaced ports being alternately registerable with said fluid passages as said valve is moved from one extreme position to the other to effect alternate discharge of fluid from said chambers through the other of said hollow plungers.

THOMAS H. LEATHEM, Sr.